Nov. 18, 1969  A. KOLIN ET AL  3,479,277
ELECTROPHORETIC FRACTIONATING APPARATUS
Filed March 29, 1965  3 Sheets-Sheet 1

INVENTOR.
ALEXANDER KOLIN
PAUL A. COX
BY John E. Wagner
ATTORNEY

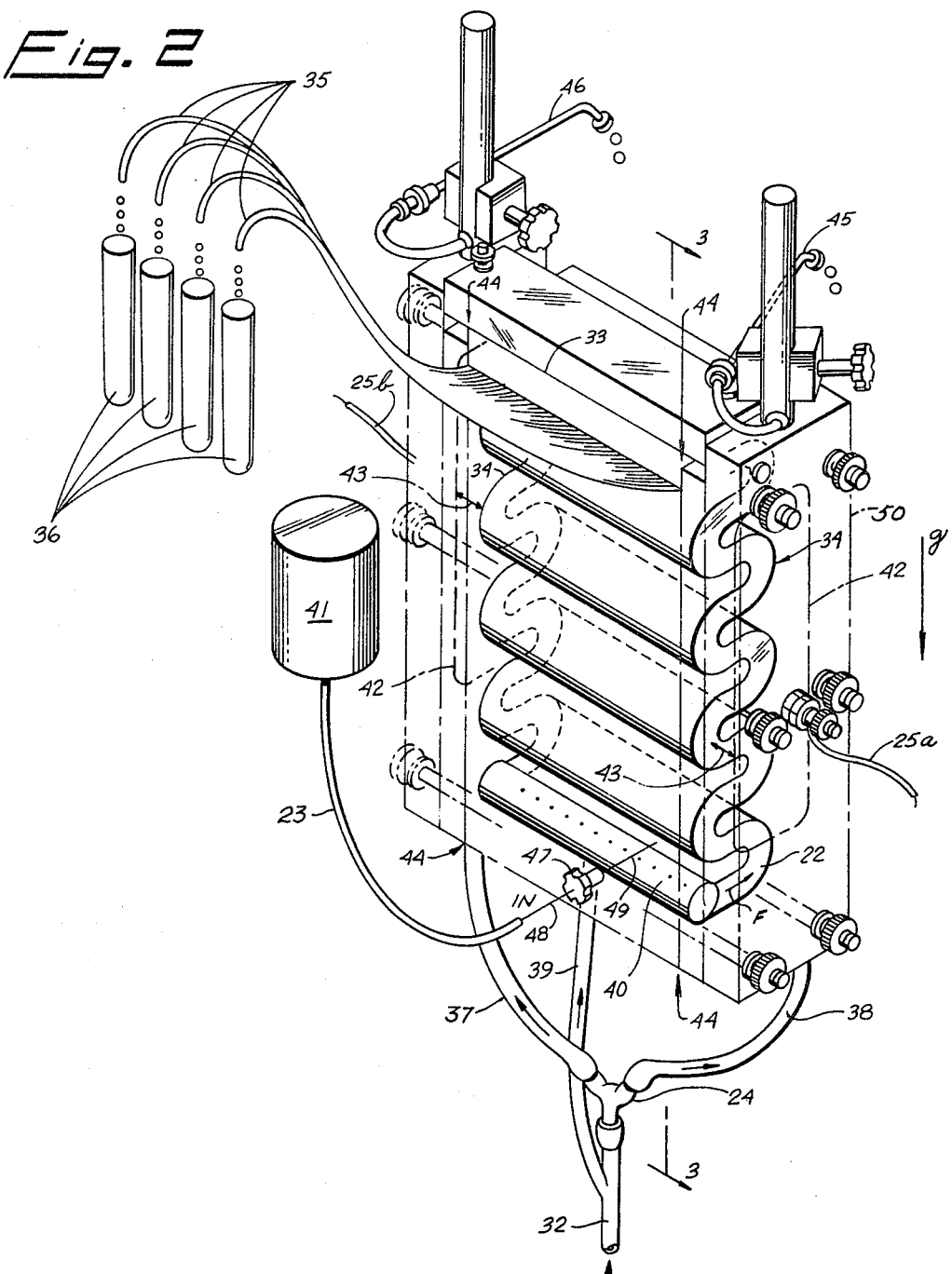

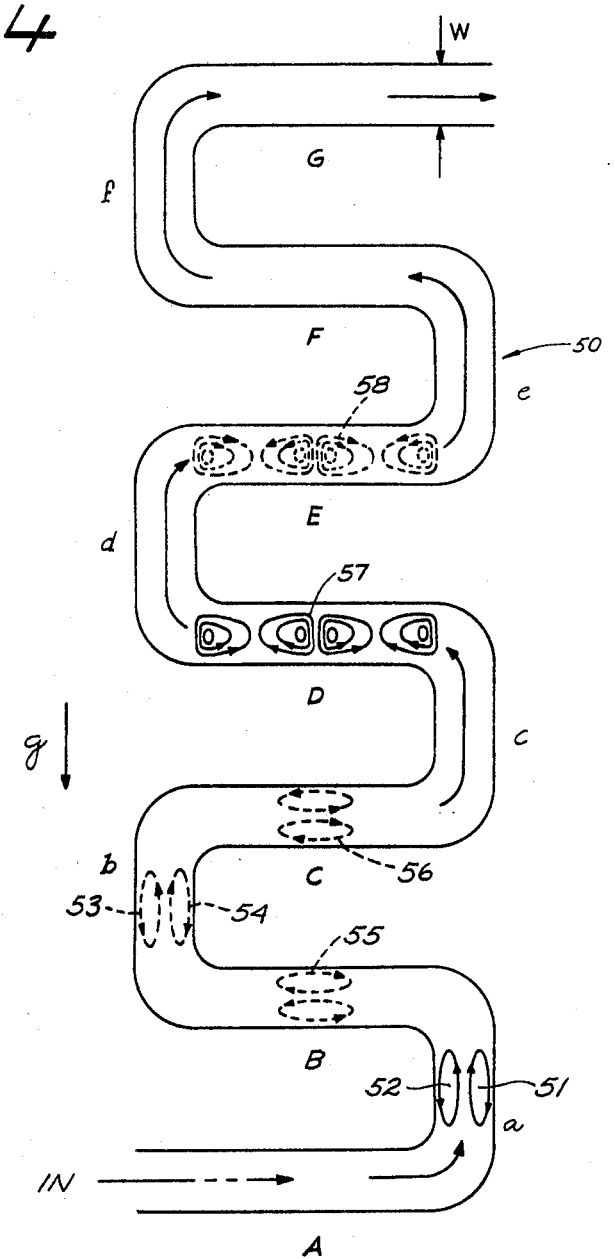

United States Patent Office 3,479,277
Patented Nov. 18, 1969

3,479,277
ELECTROPHORETIC FRACTIONATING
APPARATUS
Alexander Kolin, Los Angeles, and Paul A. Cox, Pacific
Palisades, Calif., assignors to The Regents of the University of California, a corporation of California
Filed Mar. 29, 1965, Ser. No. 443,307
Int. Cl. B01k 5/00; C23b 13/00
U.S. Cl. 204—299                                           8 Claims

ABSTRACT OF THE DISCLOSURE

Improved electrophoretic apparatus is provided in which electrically charged particles suspended in a fluid move under the influence of an electric field, and which is used for the continuous flow electrophoretic separation of components of the fluid. The particular apparatus to be described herein has a serpentine column for the fluid which is stabilized against thermal convection.

---

This invention relates to electrophoretic separation of components of a mixture and more particularly to an electrophoretic fractionating apparatus for continuous flow separation having a serpentine liquid column stabilized against thermal convection.

Continuous electrophoresis of a flowing liquid of uniform density without thermal stabilization has been accomplished in the prior art by flowing the liquid through a porous medium such as a paper curtain and by the traversing of a bed of glass powder by the stream of liquid. These approaches to continuous electrophoresis have been made in an effort to eliminate some of the undesirable effects such as electro-osmosis, adsorption and fanning of the separated components of the liquid which tend to limit the resolving power of the process and impede the passage of some components, such as suspended particles, through the electrophoretic column.

Four-foot long vertical fluid columns have been used with a 2 x 3-inch cross section into which the mixture to be fractionated was injected at the bottom in a 2 mm. thick ribbon spreading over the width of the cell. It was necessary to raise the viscosity of the buffer for this use. Seven exit slits were provided to collect the separated fractions.

Others have used non-vertical fluid sheaths of capillary structure for stabilization against thermal convection. The narrow lumen or aperture of such devices limits the scale and sharpness of the separation. For separation of materials which have a tendency towards sedimentation, this method is difficult because the sediment in such narrow confines impedes the flow.

In a co-pending application Ser. No. 500,817 filed Oct. 22, 1965 for Electrophoretic Fractionating Apparatus there is described an approach toward the stabilization of an electrophoretic column against thermal convection based upon the fact that a unidirectional gravitational field is present to support thermal convection and that its effects can be eliminated by slowly rotating a fluid column, which is equivalent to exposing the convection pattern to a rotating gravitational field. This fluid rotation is engendered electromagnetically by a magnetic structure which creates a novel radial magnetic field configuration generated across an annular electrophoretic column. In the column the ions move on spiral paths resulting from the electrophoretic migration combined with the circular motion imparted by the radial field. The separated components of the mixture flow on paths of different circular pitches as they travel in a spiral down the electrophoretic column due to their different electrophoretic mobilities.

The present invention contemplates a further improvement in the stabilization of electrophoretic columns against thermal convection by the use of a serpentine electrophoretic column. The improved electrophoretic column, due to its serpentine configuration, does not require means to create motion in a circular path as in the apparatus of the above-described co-pending application, and does not employ a closed circular path or magnetic fields.

The particular advantage of the new system of electrophoretic fractionation is that it may be more readily applied to large scale separation processes.

A further advantage of the new system described and claimed herein is that resolution can be increased by simply extending the length of the serpentine column, the electrophoretic path, thus overcoming a drawback of the spiral electrophoertic system, that is, the possibility that the $n$th spiral of a separated component of a mixture may coincide with the $m$th spiral of another separated component thereof in a long migration path.

Accordingly, it is an object of this invention to provide an electrophoretic separation apparatus stabilized against thermal convection without the use of magnetic fields.

It is another object of this invention to provide an electrophoretic separation apparatus which is well stabilized against thermal convection by means of column configuration.

It is a further object of this invention to provide an electrophoretic separation apparatus wherein the electrophoretic column is of a serpentine configuration.

It is still another object of this invention to provide an electrophoretic fractionating apparatus having a high resolving power and which may be readily extended for greater resolution simply by increasing the length thereof.

It is a still further object of this invention to provide electrophoretic fractionating apparatus wherein thermal stabilization is achieved through an electrophoretic column in which the convection patterns of flow are periodically inverted with respect to the gravitational field so as to suppress the thermal convection effect.

These and other objects of this invention will become more clear from the specification which follows and the accompanying drawings in which a preferred embodiment of the invention is shown. It should be clearly understood that the embodiments shown are merely illustrative and are not to be construed as limiting the invention thereto since those skilled in the arts appertaining hereto will be able to devise other embodiments in the light of the teachings herein within the ambit of the appended claims.

In the drawings:

FIG. 2 is a partially schematic and partially functional illustration of a serpentine electrophoretic fractionating apparatus according to this invention;

FIG. 4 is an explanatory schematic diagram of a vertical serpentine column extending horizontally.

Electrophoresis is normally carried out in an electric field which is maintained in a conductive fluid such as a buffer solution. To maintain the electric field the buffer solution must be traversed by an electric current of appropriate magnitude and density. In an electrophoretic column of a uniform cross section in the heat generated per unit volume will be related to the square of the electric field times a constant or to the square of the current density divided by a different constant in accordance with Ohms law. In the absence of turbulence this heat is normally expected to escape by heat conduction through the walls of the electrophoretic column or channel at a rate related to the temperature gradient of the fluid and that of the confining walls of the column.

As a matter of fact, however, the transfer of heat from the fluid to its surroundings is accelerated by thermal convection due to a temperature gradient transverse to the walls of the electrophoretic column.

Thermal convection is avoided when the density of the fluid is independent of its temperature or when the direction of a temperature gradient parallel to the gravitational field results in an increase in fluid density in the direction of the gravitational field.

The invariant convection pattern depends upon the direction of the temperature gradient relative to the axis of the gravitational field and on the geometry of the fluid container relative to the gravitational field and its orientation therein.

Between two vertical walls a fluid will exhibit a convection pattern wherein the central fluid rises due to the heating of the fluid while due to the cooling against the wall surfaces the denser fluid adjacent to the walls descends.

Between two horizontal surfaces a more complex convection pattern occurs. The pattern of heat transport by vortices has been found to resemble a mosaic pattern. The mosaic elements appear as closed convection paths in non-circular, but, rather, hexagonal vortices.

In an electrophoretic annular column with a horizontal axis such as has been disclosed in the above-mentioned co-pending application, the convection cells of the mosaic are of increasing cross section from the inner wall to the outer wall of the annular column.

Complete elimination of thermal convection is possible only in a freely falling system where no gravitational effects are present to act upon the fluid or temperature gradients.

Since there is always a gravitational influence on Earth, one can only inhibit the thermal convection. This has been done by a static method by establishing a density gradient; or a conductivity gradient in crossed electric and magnetic fields; or by cell rotation or circulation of the fluid in a narrow channel.

Figure 1:
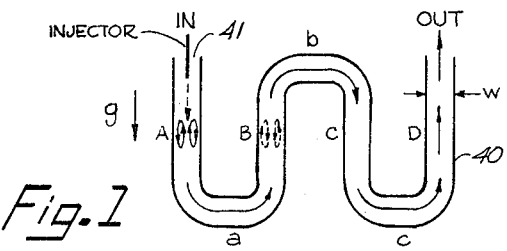
FIG. 1 is an explanatory schematic diagram of the serpentine vertical column illustrating the theoretical considerations which govern the operation of the apparatus of this invention.

If reference is made to FIG. 1 the essential condition for stabilization of an electrophoretic column against thermal convection by a serpentine configuration can be best understood. It involves the alternating inversion of the local convection patterns occurring in the electrophoretic column. This occurrence is illustrated in the drawing, FIG. 1 showing a horizontal serpentine channel 40 of width W conducting an electrophoretic medium such as a buffer solution in the presence of a gravitational field vector $g$ acting on the system. The buffer is introduced into the inlet 41 labelled IN and meanders through the channel from left to right. The four vertically extending portions of the channel are identified A, B, C and D interconnected by horizontal sections $a$, $b$ and $c$. Assume that in the region A with the buffer confined between vertical walls at a higher temperature than the walls the typical convection pattern shown by the elliptical arrows is established. Fluid flow through the column will advance the buffer region to section B where the convection pattern will be suppressed by inversion. Upon continued flow through the channel the convection pattern is repeatedly inverted resulting in effective stabilization against thermal convection. The horizontal sections $a$ and $b$ are preferably short, minimizing transit time and avoiding the formation of complex cellular convection patterns as described above for fluids confined between horizontal walls.

Continuous electrophoretic separation can thus be conducted successfully by injecting a thin stream of a mixture to be fractionated from the injector into the center of the column. The mixture is carried by the buffer through the channel and fractionated as hereinafter described without objectionable deterioration through thermal convection.

An established convection pattern as shown in section A of FIG. 1 represents storage of kinetic energy in the fluid. A certain amount of time is required to establish a given convection pattern as energy for its development and is supplied at a constant rate. Conversely, when gravitational forces which establish a given convection pattern cease to act, the fluid motion decays through damping action of viscosity. The narrower the confines through which the fluid flows, the greater will be the velocity gradients at a given average speed, and the greater will be the rate of dissipation of the kinetic energy of the fluid by internal friction.

In the case of a horizontal column as shown in FIG. 1, the convection pattern established in section A is reoriented with respect to the gravitational vector $g$ upon entering the horizontal section $a$ so that the convection pattern can no longer be maintained. It will thus decay due to viscosity of the buffer as it is transported through the horizontal section $a$. Similarly, remaining horizontal sections $b$ and $c$ will attenuate the convection patterns engendered in the vertical sections which precede them. The effectiveness of this attenuation will increase as the channel width is diminished.

Complex convection patterns can also be established in a fluid confined between horizontal walls in the presence of vertical temperature gradients creating an unstable density distribution in the fluid. These patterns will also tend to be inhibited by successive inversions as well. This is illustrated in FIG. 4 showing a vertically extending serpentine column 50 having vertical sections $a$–$f$ and horizontal sections A–G. The channel width is represented by the letter W.

If the fluid to be separated is injected at the inlet designated IN passing upwardly through the serpentine path (due to streaming maintained by a hydrostatic pressure head or by a pump) thermal convection currents illustrated at 51 and 52 in section $a$ will be formed due to heating by the electrophoretic current. The mass of fluid moves upward to horizontal section B where the convection patterns 51 and 52 tend to decay. After passage through the next vertical section $b$ the flow enters horizontal section C and the convection patterns of B are inverted. Successive inversions occur as the buffer moves through sections D–G as illustrated by the vortices in sections D and E.

Considering the successful stabilization through pattern inversions accomplished in both the horizontal column of FIG. 1 and the vertical column of FIG. 4, it becomes apparent that the direction of the gravitational vector $g$ with respect to the direction of buffer flow is not significant. Successful stabilization results from the flow direction reversals of the serpentine column producing convection pattern inversions. Therefore, successful electrophoretic fractionating apparatus embodying this invention may be designed and operated with the migration of fluid in any direction with respect to the gravitational field vector $g$, provided the column produces pattern inversions.

Figure 3:
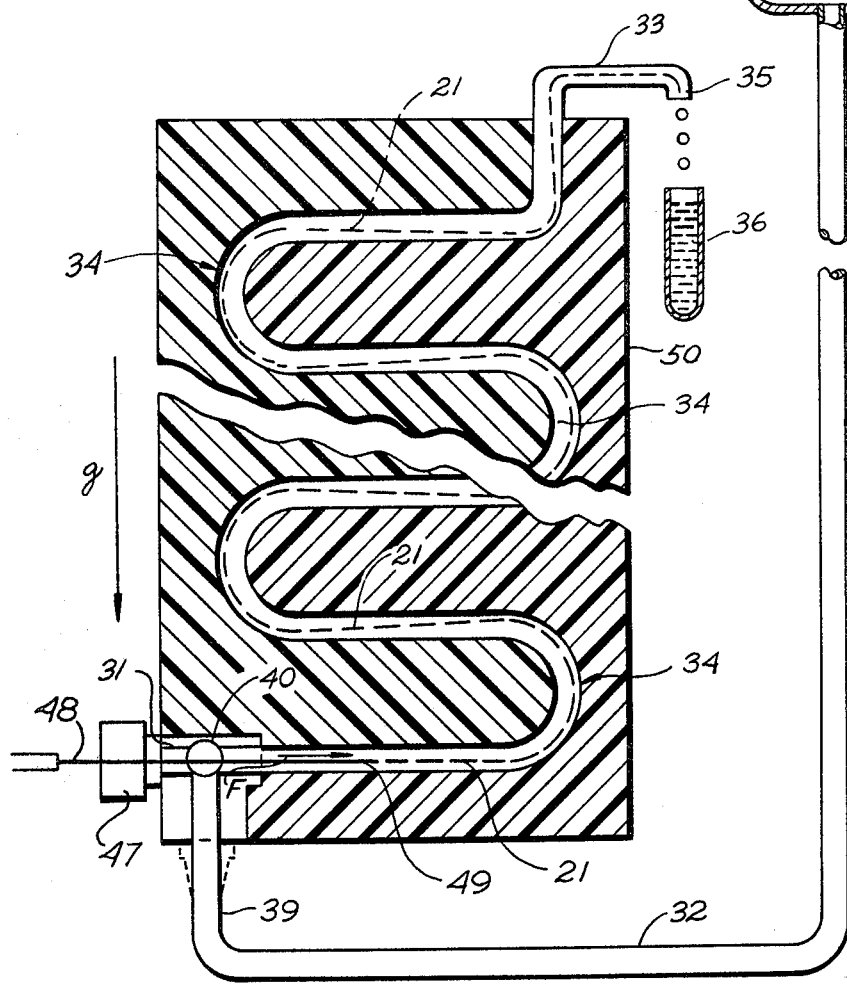
FIG. 3 is a schematic explanatory illustration describing the operation of the apparatus in FIG. 2.

In FIGS. 2 and 3 considered together and to which reference is now made, a serpentine channel 34 is shown oriented to receive buffer solution to be transported therethrough in a direction opposite to the direction of the gravitational field vector $g$.

In FIG. 3, buffer solution 30 is distributed from the Mariotte bottle 20 through tubing 32 via the manifold 40 into the separation cell 50 whose electrophoretic column 34 has the indicated serpentine shape. The buffer solution 30 enters the separation column 34 at the bottom 31 in the direction of the arrow F and meanders toward the top to reach the escape manifold (collector) 33 where the buffer and the separated fractions leave the cell 50 through small tubes 35 shown in perspective in FIG. 2. A particle from reservoir 41, shown in FIG. 2 entering the buffer stream at the exit of the injector IN and differing in density from the buffer solution 30, will oscillate about the midline of the flow channel due to sedimentation as it moves in the meandering stream. This is indicated by dashed line 21 in FIG. 3. Precipitation of such particles can be avoided even if their density differs considerably from the density of the buffer if the buffer flow is rapid enough. The particles then follow the oscillating path indicated by the dashed serpentine line 21 in FIG. 3. As a rule the density of the buffer 30 can be adjusted by dissolving sucrose in it and the stream can be made rapid enough to make the deviations of the dashed particle path from the center line of the flow channel inappreciable. In the present invention the density and velocity of the fluid are adjusted so as to obtain this condition.

The electric current applied at terminals 25a and 25b is passed through the buffer solution 30 in the cell 34 at right angles to the page (FIG. 3) by means of electrode plates 42 (FIG. 2) which are to be imagined below and above the page as pictured in FIG. 3 and parallel to it. The buffer 30 enters the cell 34 through the tube 32 and leaves through the collector tube 35 at the rate of about one drop in ten seconds for each tube to be collected in test tubes 36. Considered as shown in FIG. 3, electrophoretic migration occurs thus at right angles to the buffer flow as well as to the plane of the page. To suppress contamination of the buffer 30 in the electrophoretic column 34 by electrolysis products, the electrodes 42 are separated from the serpentine fractionation channel 34 by cellulose dialyzing membranes 44 such as described in the co-pending application Ser. No. 500,817, and the electrode compartments 43 are perfused by buffer 30 as shown in perspective in FIG. 2. The buffer 30 enters the electrode compartments 43 through the tubes 37 and 38 and leaves them at the rate of about two drops per second through the drain tubes 45 and 46. Tube 39 conveys the buffer to the serpentine channel 34 via the manifold 40 and the buffer escapes through the collector tubes 35 into the test tubes 36. Some of the tubes 35 carry the separated components of the mixture introduced from reservoir 41 into the buffer stream via injector IN. The membranes 44 are compressed between two rubber gaskets (not shown in the figure) which parallel the serpentine channel 34. The membranes 44 form thus the side walls of this channel. The planes of the membranes 44 are indicated by the arrows at 44 in FIG. 2. The injector IN is a gauge #24 or #22 hypodermic needle 48 inserted through a polyethylene screw 47 into the manifold 40 so as to project into the serpentine channel 34 as shown in FIG. 3. The needle at 49 is bent slightly so that rotation of the screw 47 moves its exit hole up or down, thus allowing the centering of the origin of the streak into the serpentine channel 34.

The electrodes 42 do not come down to the bottom of the electrode compartments 43. This leaves the first turn 22 of the flow channel unobstructed to observe the accuracy of centering of the streak containing the components to be separated which are injected through IN from reservoir 41 via tubing 23. Avoidance of an electrical current in this space has the advantage of eliminating electrolysis at the metal tube IN making it thus unnecessary to insulate it by a coat of lacquer or other means.

The operation of the serpentine fractionating apparatus therefore may be described as follows:

A mixture to be separated is kept in reservoir 41 and is permitted to flow through tube 23 to be injected by a five-apertured hypodermic needle 48 through a plastic-screw 47 into the manifold entrance 40. From manifold 40 the mixture flows into the serpentine column 34. Column 34 is supplied with a buffer solution 30 from Mariotte bottle 20 through a tube 32 which feeds manifold 40 through a branch 39. A T-junction 24 breaking into branches 37 and 38 from tube 32 feeds buffer solution 30 into electrode compartments 43. The compartments 43 are separated physically from serpentine column 34 by dialyzing membranes 44 which permit the flow of electric current and so an ion interchange between electrode compartments 42 and serpentine channel 34 may take place without intermixture of the buffer fluids therein.

In electrode chambers 43, electrodes 42 are positioned and connected to leads 25a (+) and 25b (−) which are normally connected to a source of D-C potential resulting in a current path between the electrodes setting up an electric field between electrodes 42 across serpentine channel 34. The buffer solution is fed to channel 34 so as to create an upward flow therethrough at a slow rate.

This results in the migration of particles of the mixture from reservoir 41 traveling through the serpentine channel 34 moving to the left or right of center depending on their respective electric charges and polarities relative to the electric density of the buffer solution 30 in serpentine column 34. The particles will form fine lines as they migrate upward through serpentine column 34 towards exit manifold 33. The outlets 35 therein are positioned so that each separated component drops into a receptacle 36 provided for it.

Because of the serpentine configuration as described herein, the buffer is stabilized against thermal convection by periodic inversion of temperature gradients in the liquid and of the vortices which constitute thermal convection. This inversion takes place repeatedly as the buffer migrates up the serpentine column.

It may therefore be seen that simply the configuration of the electrophoretic column is responsible for the stabilization against thermal covection thereby eliminating the need for more complex stabilizing systems. The configurations of FIGS. 1 and 4 illustrate that the principle of this invention is equally applicable to vertically and horizontally extending columns. At intermediate angles with respect to the gravitational vector, the system is also fully operative. In fact the serpentine electrophoretic column is operative in any orientation where the liquid column undergoes vertical displacement either locally in individual convolutions or overall while passing through the serpentine path. This invention also allows the continuous and diverse separation of mixtures at a broad range of flow rates merely by replication of the column convolutions and lineal extension of the column width.

The embodiments of this invention described above are only illustrative of the principles of this invention and it is fully recognized that one skilled in the art, following our teaching, can devise other variants without departing from the spirit of our invention. The grant hereof therefore is not limited to the embodiments illustrated, but rather by the scope of the following claims and the equivalents thereof.

What is claimed is:

1. Continuous flow electrophoretic fractionating apparatus including: a longitudinally extending electrophoretic column member having an inlet region at one end and an outlet region at the other end and electrodes disposed at opposite sides, said column member having a serpentine configuration serving to conduct an electrophoretic fluid, such as a buffer solution, from said inlet region to said outlet region in the presence of a gravitational field vector acting thereon, and said column member defining a channel for the fluid having first longitudinally spaced portions extending in one direction and second interconnecting portions extending in a second direction transverse to said first direction so as to effect an alternating inversion of local convection patterns occurring in said fluid in said electrophoretic column member and thereby to stabilize said column against thermal convection in said fluid.

2. The combination defined in claim 1, in which said first portions of said electrophoretic column member extend in a vertical direction and said interconnecting portions thereof extend in a horizontal direction.

3. The combination defined in claim 1, in which said first portions of said electrophoretic column member extend in a horizontal direction, and said interconnecting portions thereof extend in a vertical direction.

4. The electrophoretic fractionating apparatus defined in claim 1, and which includes means for introducing a fluid to be separated into its components at said inlet region of said electrophoretic column member, and means for collecting the separated components at said outlet region thereof.

5. The combination defined in claim 2, and which includes a pair of chambers for said electrodes disposed at opposite sides of said electrophoretic column member and communicating with the interior of said column member.

6. The combination defined in claim 5, and which includes ion-permeable membrane members enclosing the sides of said electrophoretic column member and hydraulically separating said column member from the aforesaid electrode chambers.

7. The combination defined in claim 2, and which includes a plurality of output tubes of predetermined physical separation at said outlet region of said column member for receiving different separated fluids occurring at said outlet region.

8. The combination defined in claim 5, and which includes means for further injecting said buffer solution into the aforesaid electrode chambers.

References Cited
UNITED STATES PATENTS

| 2,879,217 | 3/1959 | Durrum et al. | 204—299 |
| 3,326,790 | 6/1967 | Bergrahm | 204—299 X |

JOHN H. MACK, Primary Examiner

E. ZAGARELLA, Jr., Assistant Examiner

U.S. Cl. X.R.

204—180